US008149688B2

(12) United States Patent  
Cinato et al.

(10) Patent No.: US 8,149,688 B2
(45) Date of Patent: Apr. 3, 2012

(54) METHOD AND SYSTEM FOR IDENTIFYING FAULTS IN COMMUNICATION NETWORKS

(75) Inventors: Carlo Cinato, Turin (IT); Annamaria Gandola, Turin (IT); Francesca Mola, Turin (IT)

(73) Assignee: Telecom Italia S.p.A., Milan (IT)

( * ) Notice: Subject to any disclaimer, the term of this patent is extended or adjusted under 35 U.S.C. 154(b) by 455 days.

(21) Appl. No.: 11/988,382

(22) PCT Filed: Jul. 6, 2005

(86) PCT No.: PCT/EP2005/007298
§ 371 (c)(1),
(2), (4) Date: Jan. 7, 2008

(87) PCT Pub. No.: WO2007/003214
PCT Pub. Date: Jan. 11, 2007

(65) Prior Publication Data
US 2009/0109860 A1 Apr. 30, 2009

(51) Int. Cl.
*H04J 1/16* (2006.01)
*H04J 3/14* (2006.01)
*H04L 1/00* (2006.01)
*H04L 12/26* (2006.01)

(52) U.S. Cl. .......................... 370/216; 370/217; 370/351
(58) Field of Classification Search ............... 709/223, 709/224, 225, 226, 227, 232, 238, 239, 249, 709/328; 370/85.14, 216, 217, 252, 328, 370/351, 352, 390, 392, 395.31, 396, 400, 370/401, 408, 432, 471, 473
See application file for complete search history.

(56) References Cited

U.S. PATENT DOCUMENTS 6,694,362 B1  2/2004  Secor et al.
(Continued)

FOREIGN PATENT DOCUMENTS

EP  1 150 455 A2  10/2001
(Continued)

OTHER PUBLICATIONS

Biron et al.; "Ideal: A Multi-Agent Architecture for the Management of Complex Networks", Proceedings of the International Conference on Communications (ICC), Geneva, vol. 3, pp. 1875-1879, (1993).

(Continued)

*Primary Examiner* — Kwang B Yao
*Assistant Examiner* — Adam Duda
(74) *Attorney, Agent, or Firm* — Finnegan, Henderson, Farabow, Garrett & Dunner, L.L.P.

(57) ABSTRACT

In order to locate malfunction in a communication network, the elements therein are configured for generating alarm and to propagate a malfunction signalling to at least one other element in said set. Those elements in the network to which the malfunction signalling was propagated, are excluded, preferably by way of self-exclusion, from the action of locating malfunction. Preferably the arrangement is implemented in the form of a distributed agent-based architecture, wherein each element has an associated agent for categorizing the alarm information in its possession, e.g., as related to internal malfunction, contiguous malfunction, and external malfunction. The categorized alarm information is collected, preferably via direct exchange between the associated agents, for all the elements having alarmed resources physically or logically connected with each other. On the basis of the categorized alarm information collected, at least one element responsible for malfunction is elected out of those elements in possession of alarm information categorized as related to internal malfunction or contiguous malfunction, while discarding those elements in possession only of alarm information categorized as related to external malfunction.

27 Claims, 7 Drawing Sheets

U.S. PATENT DOCUMENTS

| | | | |
|---|---|---|---|
| 2002/0032769 A1* | 3/2002 | Barkai et al. | 709/224 |
| 2003/0126501 A1 | 7/2003 | Musman | |
| 2003/0204370 A1* | 10/2003 | Yemini et al. | 702/183 |

FOREIGN PATENT DOCUMENTS

| | | |
|---|---|---|
| WO | WO 01/86457 A1 | 11/2001 |
| WO | WO 02/078261 A1 | 10/2002 |
| WO | WO 2005/018249 A1 | 2/2005 |

OTHER PUBLICATIONS

"Architectural Requirements", NGOSS Technology-Neutral Architecture, TeleManagement FORUM, TMF053 Release 4.0, Version 4.1, pp. 7-9, (2004).

* cited by examiner

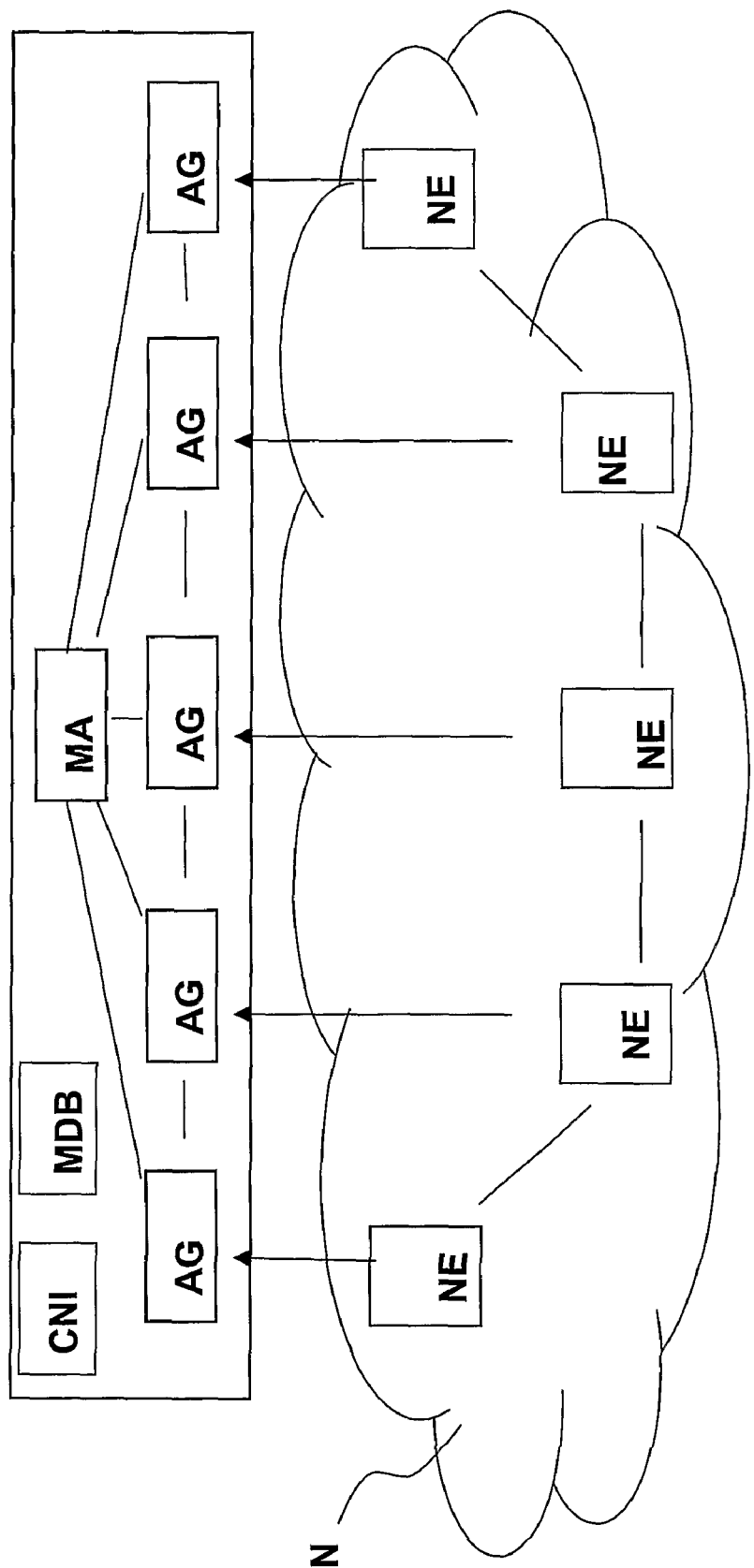
Fig_1

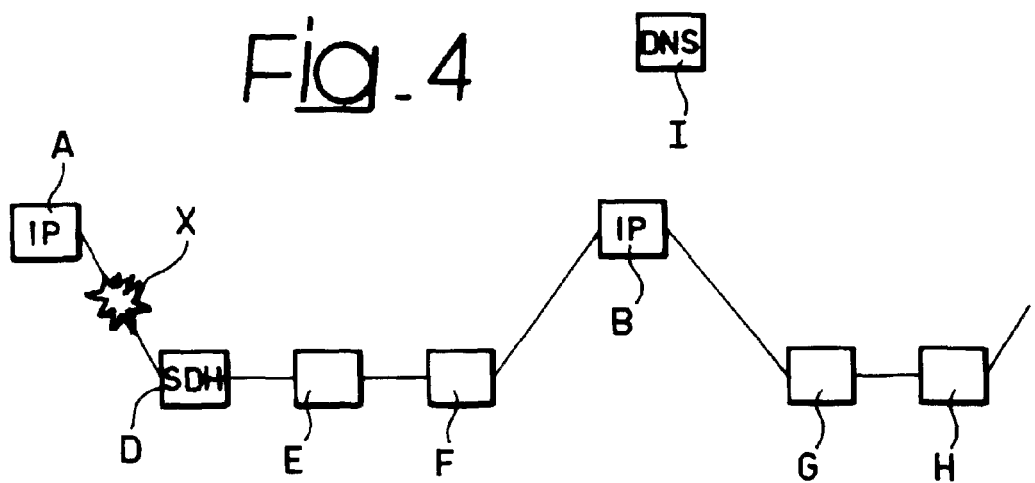
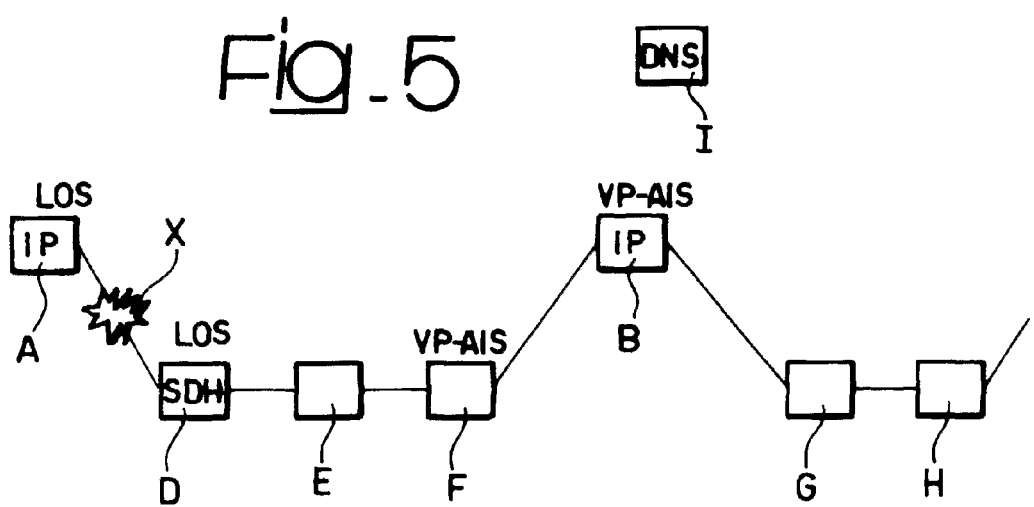
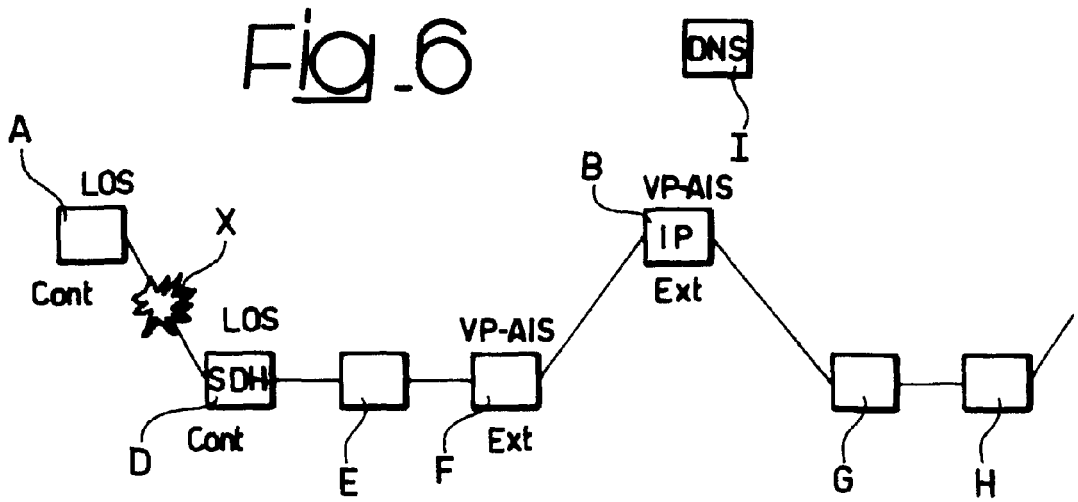

Fig_10
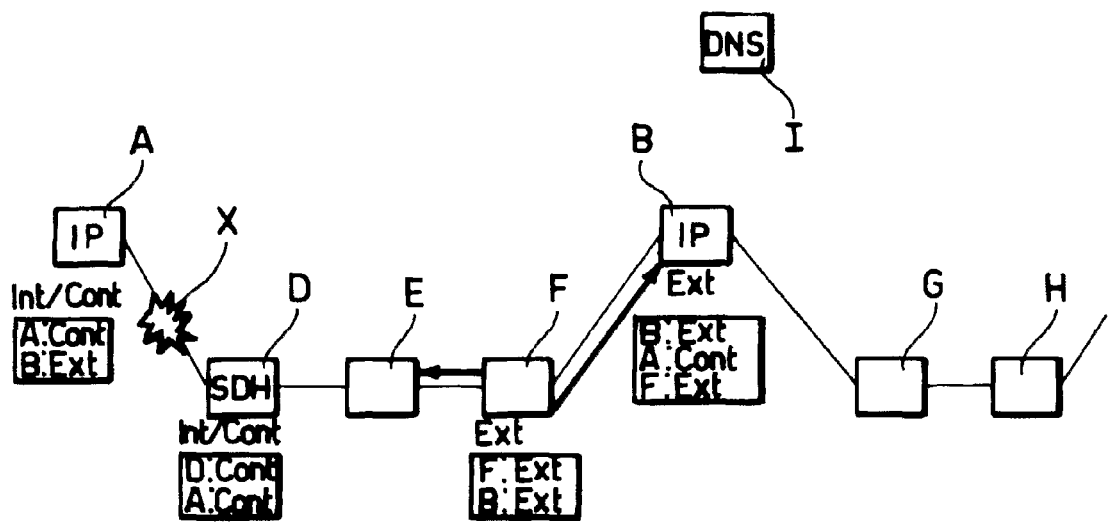
Fig_11
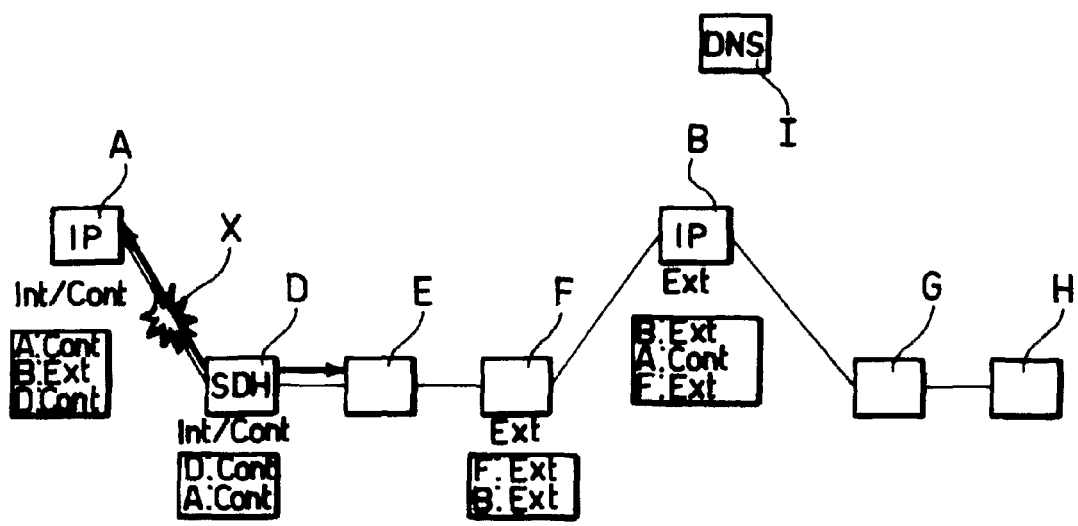

METHOD AND SYSTEM FOR IDENTIFYING FAULTS IN COMMUNICATION NETWORKS

CROSS REFERENCE TO RELATED APPLICATION

This application is a national phase application based on PCT/EP2005/007298, filed Jul. 6, 2005, the content of which is incorporated herein by reference.

FIELD OF THE INVENTION

The invention relates to techniques for identifying operating faults in communication networks and has been developed with particular attention paid to its possible use for locating faults by means of distributed-agent management environment.

DESCRIPTION OF THE RELATED ART

Ensuring service to the customer, i.e., guaranteeing that the service is rendered continuously, preventing any problems that might be perceived by the customer, is one of the main tasks of an operator of telecommunication networks and services. This task involves the need for gathering and processing the alarm signals that arrive from the network, and in particular from the network elements that make up its component parts, identifying the existence of problems (supervision), for analysing and hence identifying the causes of the problems in a such a way as to arrive as close as possible to the so-called "root cause" (diagnosis), and finally for undertaking all the actions necessary for solving any malfunction (correction). Of particular importance are the first two steps of the process, namely, the supervision of the network and the diagnosis of the causes, which comprise the activities of gathering the alarms and events from the network, screening them, and then analysing the problem and identifying the main cause behind the fault to be recovered.

The latest-generation networks and the services offered thereby, which are increasingly based upon the Internet-protocol (IP) paradigm, are a combination of technologies, network elements and different functions (access, transport, control, service, content server). In said context, the identification of the root cause behind outages can be a very complex task. Furthermore, in general, the activities are shared among network segments and rarely are there professional figures capable of dealing with the complexity inherent in a multiplicity of networks—amongst which xDSL access, ATM access and transport, IP access (NAS and BNAS), IP transport, call-control and service nodes—and with the plurality of services—amongst which access to the Internet via xDSL, transport on ATM, SDH and WDM, VPN connections, Voice-over-IP (VoIP) services, interwork between PSTN and VoIP services.

In general, when a fault arises in a portion of the network, or more specifically on a network element (apparatus), the apparatuses generate a multitude of alarms so that it is difficult for the technical personnel to understand the root cause of the problem and solve said problem in a minimum time.

Various methods and systems have been proposed for the purpose of simplifying said tasks and for identifying the best modality for managing the problem, which are, however, limited by their underlying assumptions and their constraints.

The state of the art in the field of fault management in multi-technology networks is prevalently oriented towards the use of centralized systems that implement the concept of distribution essentially to obtain sharing of the processing load and to counterbalance the intrinsic limits of scalability.

In the above architectures, the typical functional division is into three management levels. The first level, which is logically the closest to the network elements, performs functions of alarm collection, filtering, and possibly functions of first treatment of the alarms on a specific network technological domain. The second level performs functions of treatment of the alarms by cross-checking the information regarding the various underlying domains of the network. Finally, the third level treats the alarms from the standpoint of impact on the service.

Such an approach, which is based upon the concept of centralized processing, essentially derives from the consolidation in TLC environment of the TMN (Telecommunication Management Network) paradigm and is, by definition, based upon the principle of network-management layering, i.e., it locates at the network-management and service-management level the most advanced processing operation, relegating to the element-management level the elementary functions of propagation/filtering of network events.

Starting from the principle of centralized-management, various fault-management techniques have been developed, including rule-based reasoning techniques, codebook techniques and techniques based on artificial intelligence. The latter will not be herein discussed, since, for the time being, they basically form only the subject of advanced academic investigation.

Rule-based reasoning, which takes on various forms and is at times integrated with other processing techniques, is probably the method most widely applied in centralized fault-management systems.

The above method is based upon the definition and storage in a "knowledge base" of a set of rules that is as extensive and exhaustive as possible for management of the domain in question. Data processing is performed by a "rule engine", which implements a strategy of application of the rules starting from the data contained in a "working memory", with the dynamically updated description of the situation to be handled.

Notwithstanding its effectiveness, which is on the other hand proven by its widespread adoption in commercial applications, the method presents a number of limitations, such as its dependence upon knowledge of the context, which is translated in formal terms starting from the individual skills of persons skilled in the sector and is consequently liable to gaps and errors, and the impossibility of adopting automatic-learning strategies starting from the processing that has already been performed.

A further limitation of the above approach is constituted by its difficulty in adapting flexibly to a constantly evolving reality and in dealing with non-deterministic behaviours (for example, the case of loss of network events or the occurrence of spurious events).

Notwithstanding the fact that rule-based reasoning can be used in principle also for implementing alarm correlation and root-cause analysis, in actual fact the effectiveness of this method for said purposes is markedly impaired by the difficulty of translating into exhaustive rules the knowledge regarding the behaviour of the network, both on account of the complexity of the topology, and on account of the presence of different vendor-specific technologies and solutions, which are typical of the networks of the main service providers.

Consequently, the most widespread rule-based systems, albeit constituting candidates for achieving the targets of alarm correlation and of root-cause analysis, are typically limited in their operative implementation to bulk aggregation of some potentially correlatable alarms and to the so-called "downstream suppression" or alarm reduction starting from a distinction between induced alarms and main alarms, according to the principles of network layering.

The concepts outlined above find application in some methods and systems for centralized processing of the alarm information, such as those described in WO-A-02/78261 and U.S. Pat. No. 6,694,362, which address, respectively, the issue of elimination of redundant alarms and false alarms and that of impact analysis.

The method based upon codebook techniques, described for example in US-A-2003/204370, constitutes an interesting and original approach to the themes of alarm correlation and of identification proper to root-cause analysis. This technique is based upon the translation of the problem of identification of relationships of causality between faults and alarms from the context of network management to that of binary-code processing. The method is articulated in two steps:

a first step directed at the definition of a reference model in which the relationships of causality between faults and alarms of the managed network are represented as an array of binary codes (in which 1 indicates the presence of the relationship of causality between fault and alarm and 0 the absence of causality) and at the subsequent simplification of the set of cases by means of application of code-processing techniques (codebook identification); and
   a second processing step substantially consisting in the execution of a pattern-matching algorithm, which compares the set of the events present in a given time interval with the codebook identified, in this way determining the faults that have given rise to the alarms.

By application of the concept of Hamming distance, proper to code theory, this system guarantees a certain flexibility in processing by ensuring the possibility of tracing back to the root faults even in the case of loss of some alarms or presence of spurious events.

The formal elegance and linearity of this approach have formed a point of major importance in the literature on the subject. It should, however, be pointed out, amongst the main obscure areas of the method, the fact that it represents a technique that is oriented towards simplifying run-time processing by shifting the complexity of the inferential problem to an initial step of modelling, which is anything but trivial and with respect to which the method in itself does not provide any solutions.

Generalized application of this method can thus be impaired by the objective difficulty in creating causal models for particularly complex/articulated network configurations in multi-technology and multi-vendor contexts.

In general, the main limitations linked to the centralized approach consist in the reduced flexibility and scalability of the applications as the technologies managed vary and as the network increases in terms of dimension and complexity. To overcome said limitations, some management architectures have been proposed which are based upon the principle of distributed processing. Said methods, which aim at replacing traditional techniques, based upon centralized processing, are inspired by the principle of distributed processing of the functions of network management, which is in turn connected to the definition of NGOSS (New Generation Operations Systems and Software) management architectures. Since the concept of markedly distributed architecture for management systems is relatively recent, the number of documents in this regard are, however, still few in number as compared to the ones that refer to centralized architecture, which is historically more extensively used. In this connection reference may be made to: "NGOSS Technology Neutral Architecture", document TeleManagementForum TMF053 release 4.0, pages 7-9, Jan., 2004.

An example is also provided by WO-A-2001/86457, in which the NGOSS principles are implemented using the "autonomous agents" technology. The disclosed solution is founded on a management architecture based upon distributed agents. Each agent performs the modelling of a Network Element (NE) and co-operatively implements, through aggregation in the so-called "network management units", the management functions. With reference to this basic architecture, WO-A-2001/86457 describes a method which enables determination of the root cause given a network event and a process which enables determination of the complex of resources as a whole that have been involved in a fault. Specifically, the document describes a method of correlation of the alarms implemented on an agent-based distributed architecture.

The Applicant observes that the solution disclosed in WO-A-2001/86457 substantially result in an algorithm of a centralized nature, which, starting from a device component (DC) that is alarmed (source DC) considers all the DCs belonging to the data path that lead from the alarmed DC to its service-user peer (DC acquaintance). In a process of this type, the agents do not play an active role, and their role is substantially limited to modelling of the network elements (modelling of the physical/logical apparatus resources in the DC). The exchange of information/data structures between agents is substantially absent, with the only possible exception of the signalling of occurrence of root-cause identification by the DC in which the root cause has been located to the DC that functions as source DC.

OBJECT AND SUMMARY OF THE INVENTION

To sum up what has been set forth above, centralized systems use different techniques and methodologies, each of which presents different advantages and disadvantages according to the approach followed.

The solutions that envision the advantages linked to the use of a distributed architecture (for example, WO-A-2001/86457 discussed in detail above) find, however, their limits in the intrinsic complexity that derives from having based the entire processing on the relationships of dependence between network resources, renouncing the use of the information content of the alarms, which are substantially treated in an undifferentiated way. Said complexity is to some extent masked by the introduction of processing steps which are not further specified (for example, the concept of identification of a data path between two peer service-users) and the solution of which, certainly anything but a trivial one, is, however, fundamental for the purposes of the overall result. In addition, said solution according to the known art does not treat cases of multiple fault (the so-called "non-unique root cause"), in which a number of potentially correlatable alarms, given the network topology and the client/server relationships between the components, can in actual fact be attributed to different faults: once the first fault has been identified with a root-cause value, no other possible faults on a data path are sought.

In addition, it is necessary to take into account the fact that the problems previously outlined emerge in a still more evident way in a context distinguished by:

a vertiginous increase in the number of the alarms managed and presented by a management application as the size of the network increases;

the difficulty in providing advanced functions that enable the user of the system to determine the network resources on which an intervention is actually required in the presence of a very large number of alarms; and the difficulty in identifying linear and homogeneous solutions for treatment of network alarms regarding heterogeneous technological domains.

The object of the invention is thus to provide an improved solution that does away with the disadvantages outlined in the foregoing.

According to the present invention, the above object is achieved by means of a method for locating a malfunction in a set of network elements in a communication network, each element having associated therewith a respective local processing entity and being suitable to generate a set of alarms when influenced by said malfunction, the method including categorizing, in each of said the processing entities, the set of alarms generated by the respective element in a first category of alarms (representative of "internal/contiguous" malfunction) if the element has detected said malfunction, and in a second category of alarms (representative of "external" malfunction) if the element has been informed by other entities of the presence of said malfunction, and electing one of said elements as element responsible for the malfunction based on the result of said step of categorizing.

For the purposes of the present invention, with "local processing entity" it is intended a processing entity related to a single network element, either located on the network element processor or external to the network element. If it is external, it corresponds to a management agent associated with the network element.

Preferably, the set of alarms within the first category is categorized in a first sub-category of alarms (representative of "internal malfunction") if the malfunction is related to a resource of the element that has communicated its malfunction status to the element, and in a second sub-category of alarms (representative of "contiguous" malfunction) if the malfunction is related to a resource of the element that has not communicated its malfunction status to the element or if the malfunction is unrelated to a resource of the element but has been detected by a resource of the element.

Preferably, the step of election is performed by exchanging, among groups of elements having a physical or logical connection with each other (i.e. physical or logical adjacency), information related to the categories of the corresponding sets of alarms, so that each local processing entity can compare said categories and identify, through predetermined criteria, the element that is directly affected by the malfunction (i.e., that is responsible for the malfunction).

Preferably, at least the process of categorizing, and advantageously also the process of electing, are performed in a distributed manner by the agents associated with the network elements.

The invention also relates to a corresponding system and a computer-program product, loadable into the memory of at least one computer and including software-code portions for performing the steps of the method of the invention when the product is run on a computer. As used herein, reference to such a computer-program product is intended as being equivalent to reference to a computer-readable medium containing instructions for controlling a computer system to co-ordinate performance of the method of the invention. Reference to "at least one computer" is evidently intended to highlight the possibility for the present invention to be implemented in a distributed/modular fashion.

A preferred embodiment of the arrangement described herein is thus a method for treatment of the alarms of a multi-technology TLC network by an agent-based management platform and for identification of the root cause of the problem, or for focusing on a minimum set of causes. Said method addresses, in particular, the problem of fault location, simplifying the normal operations of alarm treatment and limiting as much as possible, in all the steps outlined, the number of the alarms and the amount of information treated. The aim is presenting to the technical personnel a synthetic view of the network problem so as to minimize the steps of supervision and diagnosis and enable the technical personnel to take action to correct the problem in the shortest time possible or according to the operating modalities most consonant with the seriousness of the problem.

The preferred reference architecture described herein is distributed and preferably envisages the logical presence of one processing entity (e.g., an agent) for each apparatus, with the consequent capacity of treating the alarms associated to each apparatus separately.

Advantageously, the solution described herein uses as reference background the NGOSS compliant architecture described in WO-A-2005/018249. This document illustrates a management platform based upon autonomous agents, which addresses the solution of the main problems by which current management platforms are affected: insufficient scalability and flexibility, imprecise and differed alignment of the network inventory with the network.

The solution described in what follows can in any case be applied in a more general context than the platform presented in WO-A-2005/018249.

In a particularly preferred way, the solution described herein envisages a one-to-one association between an apparatus and a management agent. The solution described envisages a step of fault location via election of the agent in the area of responsibility of which the fault has occurred (identification of responsible agent), performed on the basis of an aggregate information exchanged among the agents involved in the fault.

The procedure suggested can terminate leaving an indeterminacy on whether the root fault regards a resource of the apparatus managed by the responsible agent or else a resource contiguous thereto. Said indeterminacy can occur when the alarms received by the agents do not enable discrimination between a malfunction that has occurred on the apparatus, one that has occurred on the resource link for interconnection between two network elements, or else one that has occurred on a resource of a different apparatus. A subsequent step of identification of the failed resource enables solution of the indeterminacy, with a precise indication of the cause of malfunction.

In an alternative embodiment, by providing the network elements with internal processing entities capable of performing one or more of the above described processing steps, those steps could also be performed by the network elements themselves In this case, the agents could also be absent. For example, the step of election of the network element responsible for the fault (identification of responsible network element) could be performed on the basis of an aggregate information exchanged among the network elements involved in the fault.

In a further alternative embodiment, the step of election could be performed by a centralized unit in communication with the agents and/or with the network elements, via election of the agent in the area of responsibility of which the fault has occurred (identification of responsible agent) or of network element responsible for the fault (identification of responsible network element), performed on the basis of an aggregate information exchanged among the agents or among the network elements involved in the fault or collected by the centralized unit.

Starting from the definition of relationships of a topological nature and of reciprocal influence between network elements (hence a sort of "friendship" between network elements) the solution described enables a reduction in the amount of information exchanged and used to what is strictly indispensable for the purposes of the process of identification of the malfunction. The reduction in the information used and the introduction of subprocesses that enable step-by-step focusing of the treatment of the problem proves to be the greatest advantage afforded by the proposed method.

In a possible embodiment thereof, the method of the present invention comprises four main steps.

The first step consists in the reception by each agent associated with a network element sensitive to the fault of the alarm, or alarms, sent by the corresponding network element.

The second step, of location or election of the agent responsible for the fault, enables identification in a simple way and with a fair degree of likelihood, depending upon the completeness of the alarms sent by the network elements involved, of the network element that is physically closest to the malfunction that has occurred. Since the agent that manages said network element is the one that typically has at its disposal the greatest amount of information useful for the solution of the steps of identification of the fault, correlation of the alarms, and impact on the service, the subsequent steps will be taken over by said agent.

In the third step, of precise identification of the physical resource where the fault resides, the agent responsible for the fault, elected in the second step, availing itself of the indispensable information gathered in the first step, identifies the failed network resource.

The fourth step, of alarm correlation and identification of the resources affected, is aimed at identifying which resources at the various levels of network and service protocols are involved or can potentially undergo a deterioration in performance following upon the malfunction that has occurred.

It will be appreciated that the solution described herein subverts the approach proposed, for example, in the above-cited patent application WO-A-2001/86457, delineating a process that attributes greater significance to the information content of the alarms and circumscribes the analysis of the relationship of dependence between network resources to the simplified case of relationships of physical or logical contiguity. Albeit referring in general to the overall method, the solution described herein offers a strong point in the modalities of implementation of the second step of the process of location of the area of responsibility of the fault, to which reference has been made previously.

The solution described herein envisages in particular:
- the categorization of the alarms made by the agents starting from the information regarding the type of alarm and the alarmed resource;
- the transactionality of the processing conducted by the agents, i.e., the exchange between agents of messages regarding alarms, starting from the result of the processing performed individually; and
- the co-operation between agents, which, starting from an individual and parallel processing, leads to an overall result shared by all the correlated agents (friend agents).

The categorization of the alarms is a function that enables reference to the type of the alarms, and there exist variants in processing based upon principles of distinction between alarms of a different nature and seriousness.

To sum-up, the solution described herein is aimed, given a multi-technology and multi-vendor network, at identification of the area of the corrective intervention starting from the network alarms. The information on alarms are treated as basic elements to be used in processing for tracing back to the network fault that has caused them through a distributed processing performed by autonomous agents, each of which implements the modelling of a network element, represents the set of the relations of the network element with the surrounding network domain and interacts with the other agents, through the exchange of messages.

DESCRIPTION OF THE ANNEXED DRAWINGS

The invention will now be described, by way of example only, with reference to the annexed plate of drawings, wherein:

FIG. 1 is a schematic representation of a network (which includes a plurality of network elements) to be managed by a management platform with a plurality of agents;

Figure 12:
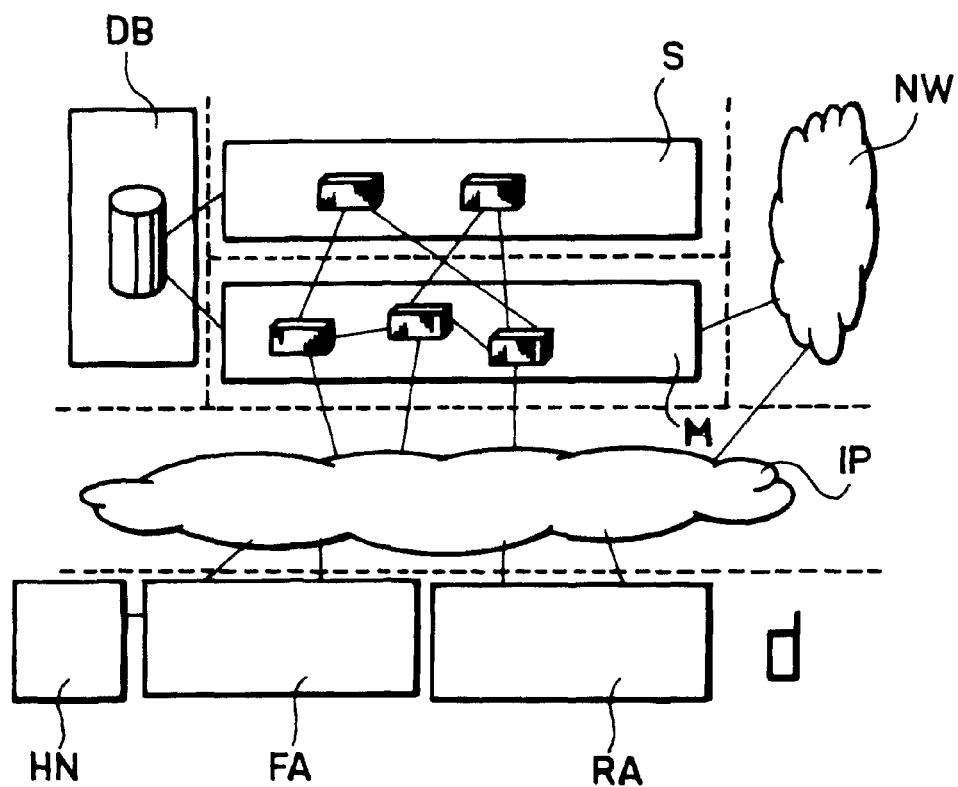
Figure 13:
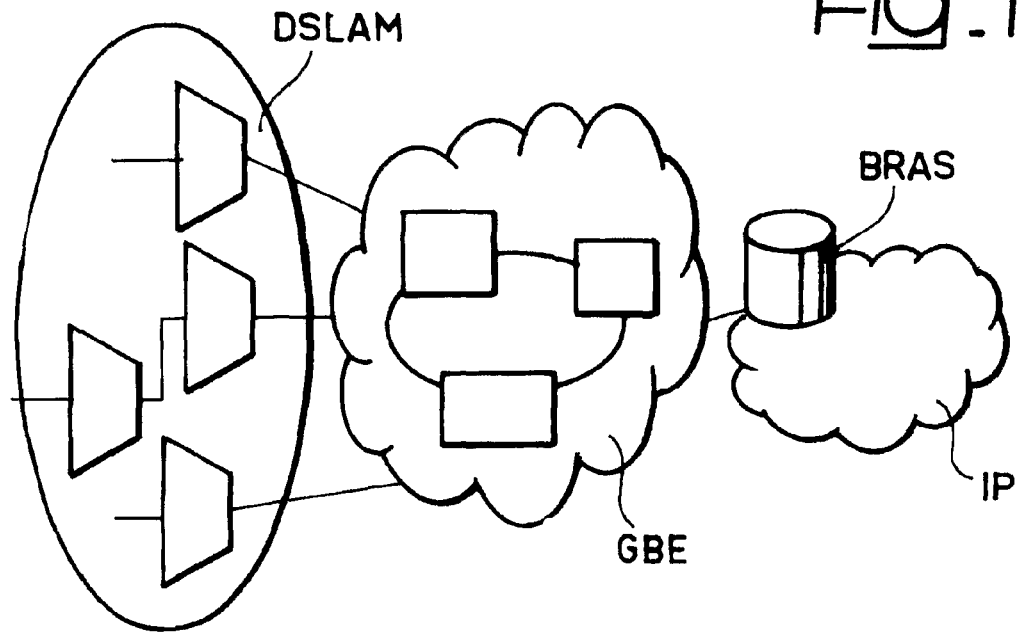
Figure 14:
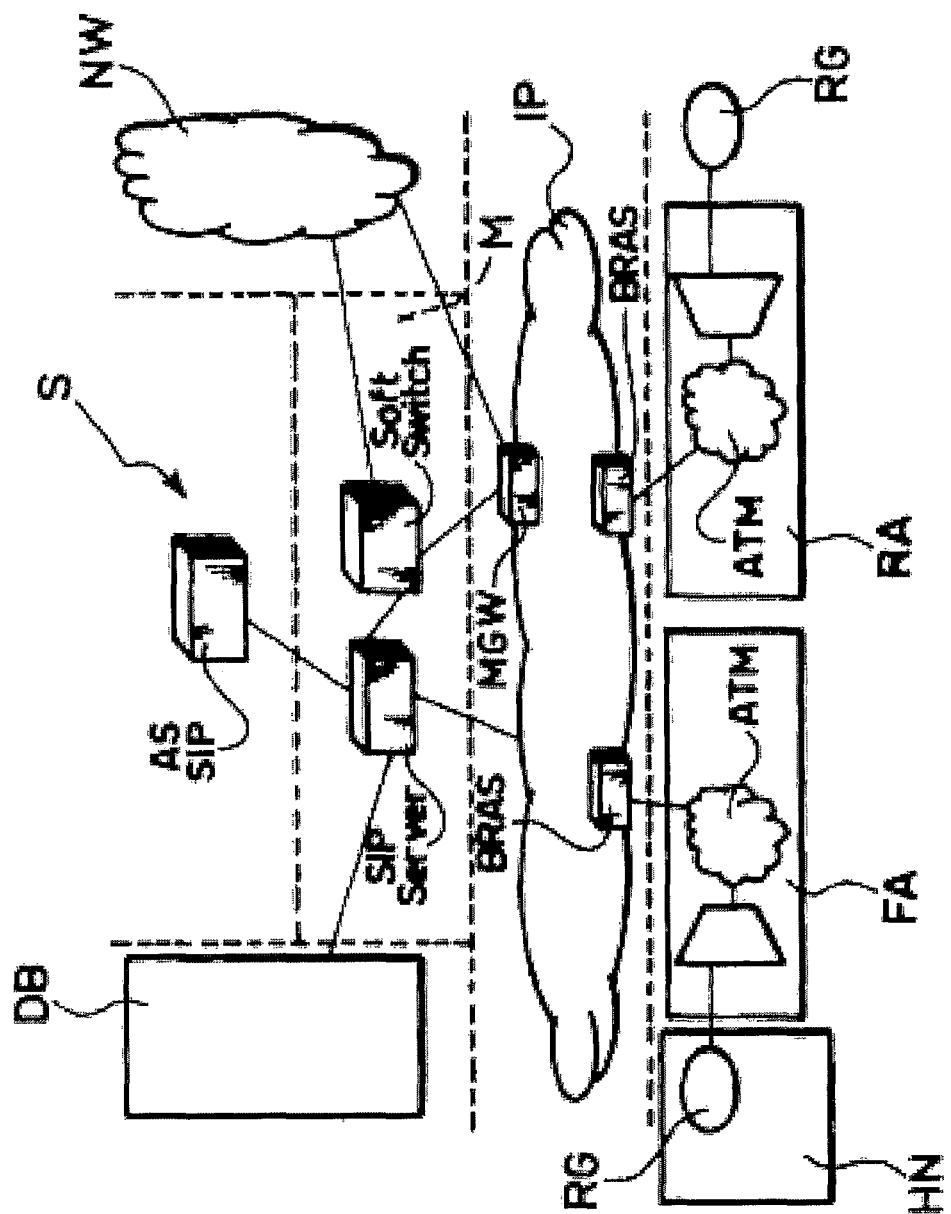

FIGS. 4 to 11 provide an example of a sequence of operations of the system arrangement described herein; and FIGS. 12 to 14 are functional block diagrams that exemplify possible network scenarios to which the invention can be applied.

DETAILED DESCRIPTION OF EXAMPLES OF EMBODIMENT OF THE INVENTION

By way of introduction to the detailed description of certain examples of embodiment of the invention, a glossary is provided indicating the meaning of certain terms used throughout this description.

Agent: the term "agent" is used herein to indicate an entity that implements the modelling of a network element and represents the set of the relations of the network element with the surrounding network domain (network elements that are physically and logically adjacent). An agent is configured moreover as a proxy of the network element, i.e., it acts as element for decoupling the network element from the management applications, providing a standard interface for interaction with the network element. An agent is therefore an autonomous process that possesses an identity and that requires communication (for example, in a collaborative or competitive way) with other agents so as to fulfill its tasks. This communication is obtained through the asynchronous exchange of messages and using a language with a well-defined and shared semantics within the platform. In the embodiment hereinafter described it will be assumed that each and every network element considered has an associated agent. The one-to-one correspondence between an agent and the corresponding network element is expressed by indicating the agent as management element of the network element and the network element as managed entity. The terms "agent" and "managed network element" may, however, be used interchangeably to indicate the relationships among different agents and among network elements.

Local processing entity: it is processing entity related to a single network element either located on the network element processor or external to the network element. In the second case the local processing entity corresponds with an agent associated with the network element.

Fault: understood by fault (malfunction) is any malfunction (in progress or foreseen) that vitiates functionality of a physical or logical network resource and that can be detected, directly by the network element on which the failed resource is located or else indirectly by network elements external to the failed resource. A fault triggers off modifications in the signalling of its own state of operation by the network elements detecting the problem, such as the sending of event signallings or variations in the value of variables or counters presented by the network element. The modification in the signalling thus results in of a malfunction signalling being propagated among the network elements.

Alarm: an alarm is a network event communicated by a NE to the agent that manages it. In particular, the alarm is a spontaneous event notified by the network element in a asynchronous way upon occurrence of given conditions, identified by the network element itself as anomalous. The notification that the network element sends to the entity that manages it comprises a set of information that enables characterization thereof. An alarm can be identifiable in a unique way by the n-tuple (d, n, r, t), with d=alarm description (or "probable cause"), n=unique identifier of the network element or unique identifier of the agent that has detected it, r=alarmed resource (unique identifier of the physical or logical resource of the NE affected by the fault), t=date/time of onset of the alarm. For some types of alarm the information regarding the resource cannot be given explicitly in so far as it is already indirectly indicated by the type of alarm. Also considered in a extensive way as alarms are the notifications of variation of state, the notifications of threshold overstepping, and other events, also generated by the agents that can perform operations of polling on variables of the managed apparatus.

Group of alarms: this is the set of the alarms generated by a NE and related to a same malfunction; this group of alarms is notified by the NE to its own agent. The alarms belonging to the same group have the characteristic of being referred to physical/logical resources between which there exists a relationship of dependence described by the functional model of the network element. Excluded from the group are alarms for one and the same network element but referring to non-correlated resources. Once a reference time interval and a network element have been fixed, there can exist, for the network element and for the agent that manages it, a number of groups of alarms regarding faults of different nature.

Supergroup of alarms: this is the set of all the groups of alarms that regard all the agents and can be traced back to the same correlated resources.

Category of a group of alarms: this is an attribute of each group of alarms calculated by the agent using only the information regarding the network element in question and serves for identifying the position of the fault or faults that cause the presence of the alarms in question with respect to the network element. The categories used for the method described are preferably: internal fault, contiguous fault, and external fault. However, a first category of "internal/contiguous fault" and a second category of "external fault" can be sufficient for performing a first selection of the network elements in the process of electing the element responsible for the malfunction.

Relationship of friendship between agents: two agents are in a relationship of friendship if they include internal resources that are physically or logically connected to each other so that when one of these resources is affected by a malfunction also the others of these resources are affected by (or at least detect) the malfunction. In other words, two agents are in a relationship of friendship if, as a consequence of a fault on a resource managed by one of the two agents or on an intermediate resource, both agents receive at least one alarm signalling from the managed network element correlated to the fault detected. For evaluation of friendship, not the service alarms but only the communication and equipment alarms are considered. The relationship of friendship thus unites agents which, as a consequence of a fault, obtain from the managed apparatus information data that can be correlated with one another and possibly used for the location and identification of the same fault. The same is valid for the network elements: the relationships of friendship comprise the network elements that have between them a relationship of physical adjacency (the two managed network elements are interconnected when no further network elements managed by agents are inserted between them but, possibly, only network elements not managed by an agent) or logical adjacency (for example a client-server relationship or a peer-to-peer relationship). Given the alarm signalling, the relationship of friendship identifies the subset of all the possible friends of an agent regarding exclusively the alarmed resources. Since an agent associates a friend to the resource of the managed apparatus through which it "targets" the friend, given an alarm signalling, only the friends targeted through the alarmed resource in question will be considered as friends for that alarm signalling. The relationship of friendship between two agents, given an alarm signalling, consequently depends upon the type of apparatus, the alarmed resource, and the type of alarm in question. For example, in the case of an alarm internal to the apparatus which does not have impact on the rest of the network (such as an alarm indicating malfunction of the fan), the agent does not have friends for that alarm. Differently, if, for example, an alarm on a port is considered, the friends are the agents of the network elements physically and logically connected on said port.

Responsible agent: this is the agent in the area of responsibility of which the root fault regarding a supergroup of alarms has occurred. Identification of the responsible agent occurs through the exchange of category information between friend agents and via the election algorithm. The responsible agent is the agent which has the greatest amount of information for identification of the fault regarding the supergroup considered. Said agent manages the apparatus on which the malfunction has occurred or, in the worst case, the malfunction has occurred on resources adjacent to the responsible apparatus, whether they are resources not managed by agents, or whether they are resources belonging to the adjacent apparatus.

Adjacent resources: by "resources adjacent to a resource" is meant the set of the resources having a relationship of physical contiguity with the given resource up to the first resource belonging to an agent-managed network element.

Procedure of election: this is the distributed procedure through which the agents that have relationships of friendship with one another, exchanging information regarding the nature of the alarms, determine the agent in the area of responsibility of which the root fault has occurred.

FIG. 1 shows, very schematically, a network management platform according to the present invention, which includes a plurality of network elements (i.e., network equipments) NE to be managed within a telecommunication network N.

The platform further comprises:
  a plurality of agents AGs, each one associated with a respective NE and configured to perform the operations described later on; each agent defines a local processing entity;
  a (logical) manager application MA, responsible for managing the distribution of processes from a Model Data Base MDB to the various AGs, monitoring the state of the platform with information provided by the AGs (including distribution of components, domain management, performance monitoring and consequent actions like redistributing load among the AGs in order to achieve proper load balance);

a network inventory NI, which may comprise a distributed network inventory and a centralized network inventory; the distributed network inventory contains updated models of the different NE and used for all real-time or almost real-time tasks as provisioning, assurance, performance, control, and so on, where updated information on the configuration and state of the network is necessary for the assurance and for the effectiveness of the task; the centralized network inventory corresponds to the usual concept of a network inventory component and used for non real-time tasks where continuous updates are not possible for a centralized architecture (example of such tasks are network design, network planning and capacity trend analysis); and a model data base MDB, which is a single (logical) point of definition and storage of all the behavioral and functional aspects of the platform, workflows, rules, information models and schemes.

As hereinafter described in greater detail, the network elements NE are configured for generating malfunction alarm to be used by the respective agents and for propagating a malfunction signalling to the other network elements physically or logically connected therewith.

Figure 2:
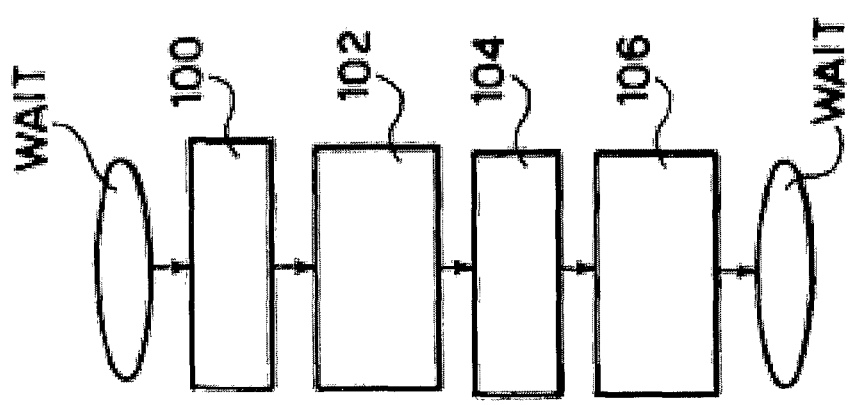
Figure 7:
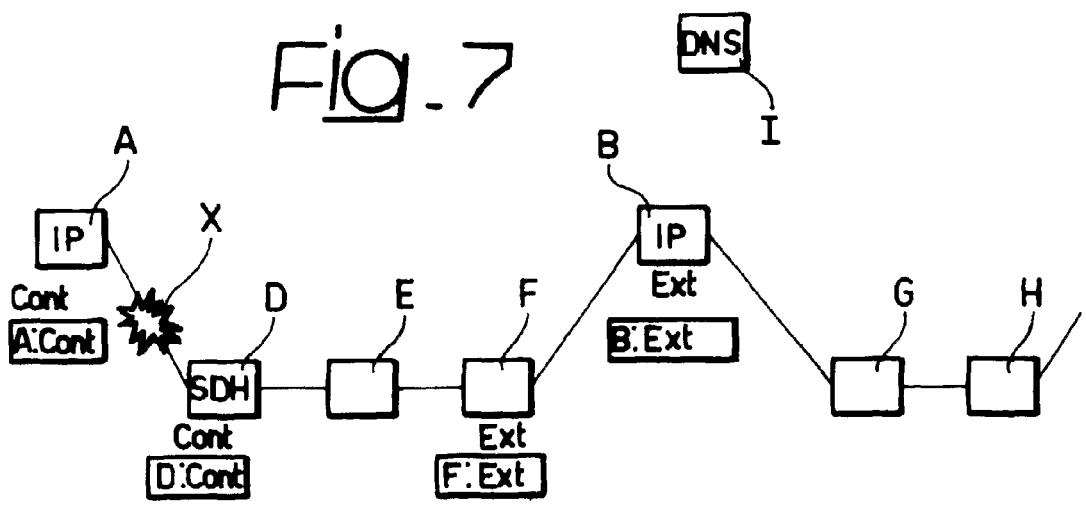
Figure 8:
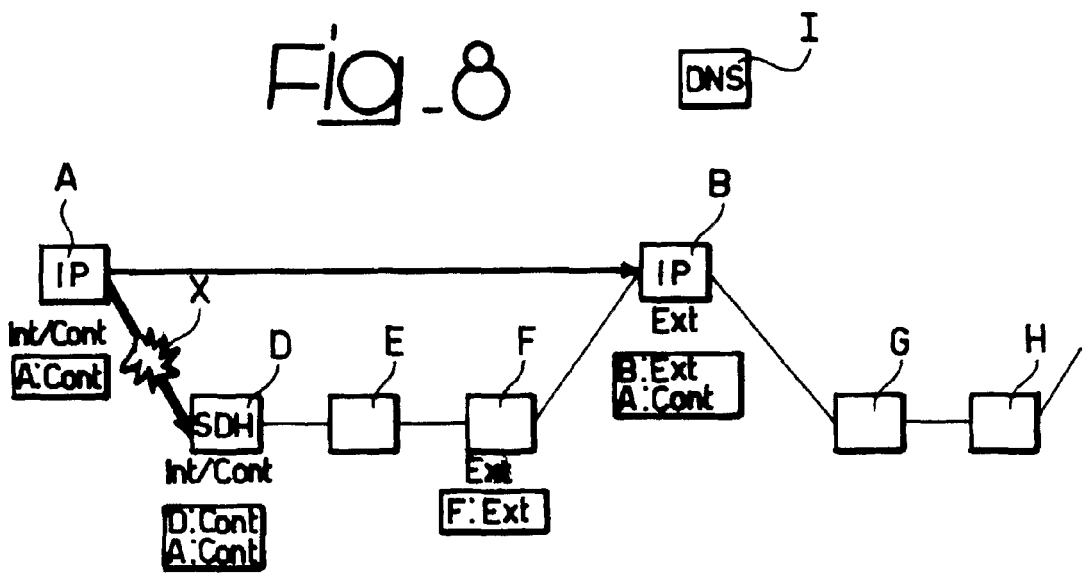
Figure 9:
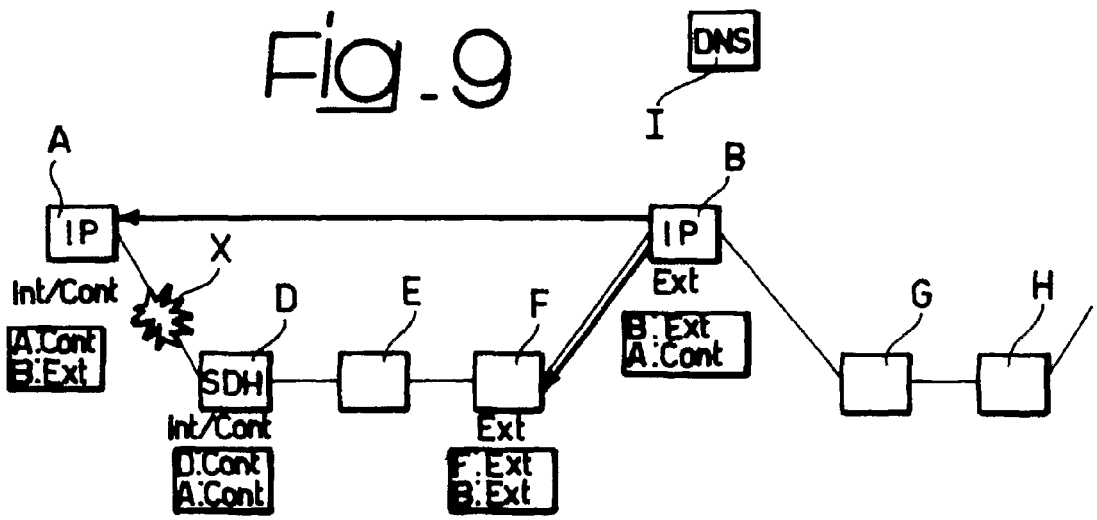

FIG. 2 provides the reference flowchart for the method proposed.

The components of the flowchart are listed and described hereinafter.

Alarm Reception (Step 100)

The function of alarm reception is prompted—starting from a general WAIT state—by any nodes in the network detecting a malfunction and is implemented by the agents. It is envisaged that the individual agent will gather the alarms sent by its own managed network element understood as event and alarm notifications generated spontaneously by the network element or else generated by a system of polling that constantly verifies the value of some indicators on the apparatus and in turn generates notifications directed to the agent. The alarm-reception function of the agent comprises also the filtering operations normally performed on the alarms received, such as: filtering of the oscillations, filtering of the persistence, etc. The alarms received are stored in the memory of the agent for subsequent uses. The criteria for performing this step or phase of the process are in themselves known in the art, and will not be described in detail herein.

In parallel to the generation of malfunction alarms by the network elements, which alarms are provided to the respective agents, there is also the propagation of a malfunction signalling from the network elements towards other network elements, in particular towards the physically and logically adjacent network elements. The malfunction signalling may be propagated by the network element for example by filling OAM (Operation, Administration and Maintenance) bits contained in the bit stream among the network elements. The reception of a malfunction signalling by another network element causes the generation of a malfunction alarm by the receiving network element.

Identification of the Agent Responsible for the Fault (Step 102)

Each individual agent groups together the alarms on the basis of the information on the resource alarmed, the type of fault, and the time of generation of the alarm. Via a distributed algorithm, the system will then identify the responsible agent from amongst all the agents that have received alarms that can be attributed to correlated resources, in particular it identifies the agent that possesses the greatest amount of information in order to perform subsequently the function of fault identification. Said agent manages the network element on which the malfunction has occurred or, in the worst case, a network element adjacent to the failed resource. The identification of the responsible agent comprises the identification of those network elements that have been informed of the presence of a malfunction, i.e. those elements to which the malfunction signalling was propagated, and the restriction of the action of locating the malfunction, i.e. of identifying the responsible agent, to the network elements other than those elements to which the malfunction signalling was propagated. This is because the network element responsible for the fault is a network element from which the malfunction signalling was generated. More specifically, the election of the responsible agent comprises, for each network element that has detected the malfunction of that has been informed of the presence of a malfunction (through propagation of the malfunction signalling), categorizing the generated alarm (i.e., the malfunction) with respect to the element (by exploiting the information contained in the alarm) at least in the categories "internal/contiguous" and "external", so that each element is associated with a corresponding categorized alarm information, and excluding from the election those elements associated with a categorized alarm information indicating an external malfunction. Each of the above element and the respective agent will therefore be associated with a respective alarm category.

The present patent will treat this component of the method in depth.

Identification of the Fault (Step 104)

Said step can be performed using only the information possessed by the responsible agent or, when the category of the responsible agent were not to be "internal", using also the information possessed by the friends of the responsible agent. The identification of the fault can be made by an operator who receives from the responsible agent, on a man-machine interface, the following minimum information:

the unique identifier of the responsible agent and of its corresponding friends;

the category of the responsible agent and of each of its friend;

the alarms received by the responsible agent;

the alarms received by the friend agents of the responsible agent in the case where the category of the responsible apparatus were not to be "internal"; and the topological information that links the resources on the responsible apparatus with the resources on the friend network elements.

The operator, with the information referred to above, will be able to identify the position of the fault in terms of failed resource. At the moment when the failed resource has been identified, the operator will enter said information, upon command, on the responsible agent. In this way, the responsible agent will be able to correlate the alarms received thereby with the fault identified in the network. The present patent will not go into further detail on this component of the method.

Display of the Fault to the Operator (Step 106)

The function of display of the fault to the operator can be performed, via a man-machine interface, to the operator directly by the responsible agent. The minimum information supplied to the operator is the following:

unique identifier of the responsible agent; and identifier of the failed resource.

After completing the process just described, the system switches back to the WAIT state.

Figure 3:
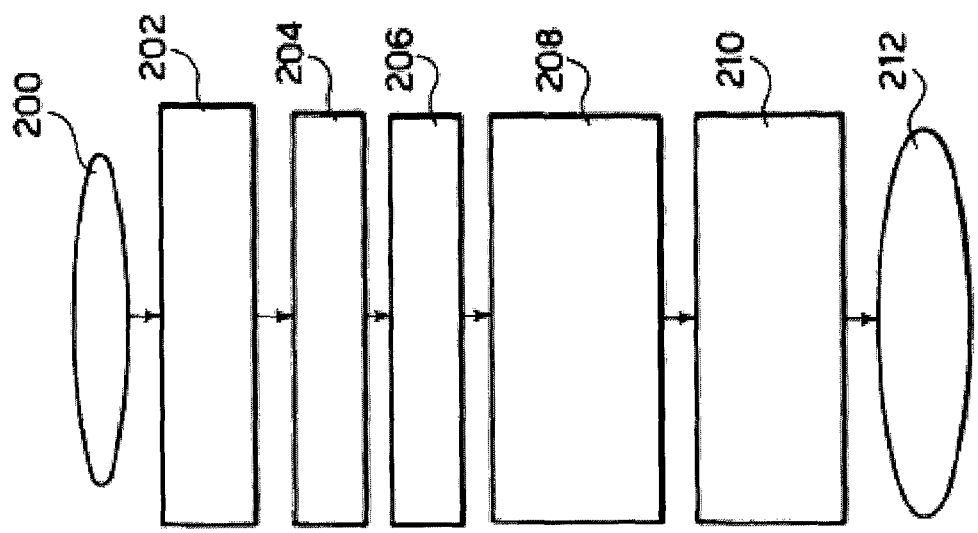
FIGS. 2 and 3 are flowcharts representing processes carried out within the system arrangement described herein.

The agent-based distributed-processing method step of identification of the agent responsible for the fault, which is also defined as "location of the fault", is described in greater detail in FIG. 3; the described operations are performed in parallel by all the agents that have received alarms at a given instant. The operation of reception by the agents of the alarms sent from the network elements is understood as being already performed. The flow of operations identified in the flowchart is preferably executed by the agents in parallel for each group of alarms identified, different groups of alarms present simultaneously on the individual apparatus being treated separately.

The steps or phases of the flowchart of FIG. 3 will be further exemplified by reference to FIGS. 4 to 11. In these figures, a portion of a communication network is shown, which includes network elements (having associated respective agents—not shown) designated by the references A to H. Of these, the elements A and B are representative of IP apparatuses connected via elements D, E, F cascaded over a link, the element D being, for example, an SDH equipment. Part of such a link, which includes elements G and H, is shown extending from the IP apparatus B. Reference I designates a server shared among different network elements, e.g. a DNS (Domain Name System) network element.

As indicated, the flowchart of FIG. 3 is primarily intended to detail the step 102 of the flowchart of FIG. 2. The flowchart of FIG. 3 thus starts with the reception (step 100 in FIG. 2; step 200 in FIG. 3) of at least an alarm regarding malfunction being detected, even as prediction of malfunction that is expected to occur. Likewise, the flowchart of FIG. 3 terminates with the identification of the entity responsible for malfunction (step 102 in FIG. 2; step 212 in FIG. 3).

In the block diagrams of FIGS. 4 to 11, the occurrence of malfunction is exemplified in the form of an event X, which leads to interruption of the connection between the elements A and D (and thus between A and B). It will be appreciated that such an event does not actually occur within either A or D, but directly affects both of them.

The components of the flowchart of FIG. 3 are listed and described hereinafter.

Association of the Alarms Received in a Group of Alarms for Each Alarmed Resource (Step 202)

The first operation that the agent performs on the alarms received from the managed apparatus and stored within is the grouping together of the alarms received, with discrimination thereof according to each alarmed resource. In this way, the agent will subsequently be able to work on the different alarm groups for the different resources of the managed apparatus. Said operation will make it possible to work on the alarmed resources irrespective of the presence of a single fault or of simultaneous faults regarding the resource in question.

The agent hence groups together the alarms received according to the resource alarmed at a given instant (all the alarms active at a given instant regarding a physical or logical resource form part of one and the same group) by using the information in its possession regarding the logical dependence between the alarmed resources (all the alarms active at a given instant regarding two logically dependent resources, such as, for example, a card and a port, are considered as forming part of one and the same group, where the reference alarmed resource is the alarmed resource of highest level upon which the other resources depend).

By way of example, let us suppose, given a network element, that two alarms x and y are received by the corresponding agent, with $x=x(n, r_x, d_x, t_x)$ and $y=y(n, r_y, d_y, t_y)$, where n is the identifier of the network elements, r is the network resource, d is the alarm description, t is the instant in time in which the alarm is issued; x and y belong to the same group if they refer to the same resource (i.e., if $r_x=r_y$), or else, if there exists between the network resources $r_x$ and $r_y$ a relationship of logical dependence of a client/server type, for example $r_x$ client of $r_y$ server (then the group of alarms will regard the alarmed resource server $r_y$), or else, if there exists between them a relationship of logical dependence of containment, for example $r_x$ is contained in $r_y$ container (then the group of alarms will regard the alarmed resource container $r_y$).

At the end of the grouping operations, the group will be identified by the following information:
 unique identifier of the network element that has sent the alarms;
 network resource to which the group is associated;
 group identifier (local identifier chosen by the agent that has received the alarms);
 instant in time in which the first alarm belonging to the group was issued; and
 list of the alarms received that have been associated to the group.

Implementation of the function of alarm grouping involves maintenance on the agent of the following information:
 equipping of the network element in terms of corruptible resources;
 relationships of containment between the corruptible resources;
 client/server relationship between the corruptible resources; and
 alarms received by the network element.

The situation outlined previously is exemplified in FIG. 5 with the issuing of LOS (Loss Of Signal) alarms by the elements A and D and of VP-AIS (Virtual Path-Alarm Indicator Signal) alarms by the elements F and B.

Calculation of the Category for the Group of Alarm (Step 204)

After grouping together the alarms received from the respective network element in order to associate them to an individual generating fault, each individual agent performs the step of calculation of the category for the set of alarms generated by the corresponding element. Said calculation is performed only with the information in possession of the agent that has received the alarm. The categories regard the position of the fault that has generated the received alarms with respect to the managed network element and the alarmed resource. At the end of the step of calculation of the category, each agent that has received in a certain period one or more alarms has the information of how said alarms are grouped together on the basis of the alarmed resources and, for each group, knows the category of alarm, i.e., knows the position of the malfunction that has triggered alarms regarding its own managed network element.

The possible alarm categories are—for example—the following, in connection with the type of faults:
 internal fault;
 contiguous fault; and
 external fault.

Each individual category of fault is described in greater detail in what follows.

Category of internal fault: the alarm regards a physical resource of the network element or, more in general, a physical/logical resource internal to the network element, in particular the resource could also play a role in the processes of communication of the apparatus itself with the surrounding network. By way of example, for some network technologies (ADSL, SDH/WDM) alarms of an equipment, environmental and processing-failure type can fall within this case. For a fault to be categorized as internal, the network element shall be aware of the status of the malfunction resource, for example thanks to a check of its own status by the resource itself.

Category of contiguous fault: the fault is intercepted by a resource that plays a role in the processes of communication of the apparatus containing it with the surrounding network; the fault is located on one of the following resources: an internal resource belonging to the managed apparatus itself (for example, the physical port), the physical infrastructures of connection between the apparatus and the adjacent apparatuses (for example, the optical fibre connection), or an adjacent resource of a contiguous apparatus (for example, the physical port of the contiguous apparatus directly connected to the alarmed resource of the apparatus in question). The alarm received does not, however, enable identification of the category of the group as internal on account of the absence of an equipment alarm regarding the resource. This can occur for example when the fault concerns an internal resource of the element (such as an optical receiver) but this resource is unable to make a check of its own status, so that the element is unaware of the status of that resource. By way of example, for some network technologies (ADSL, SDH/WDM) the alarms labelled as "communication alarms" can fall within this case.

Category of external fault: the fault is intercepted, as in the previous case, by a component of the apparatus that has a role in the processes of communication of the apparatus itself and is located on an external apparatus that is physically not adjacent. In said condition, the network element receives a signalling of remote malfunction propagated by the apparatuses that are set between this and the failed resource. This case covers all the possibilities that are not contemplated in the two cases previously listed.

In a simplified version of the method, or in a preliminary step thereof, the fault can be subdivided in only a first and a second category: "internal/contiguous" and "external", wherein the internal/contiguous category groups all the fault above indicated as internal or contiguous. This simplified categorization can be performed for excluding from the election of the element responsible for the fault the elements that are associated with the external category. In turn, the "internal/contiguous" category can be subdivided in two sub-categories: "internal" and "contiguous", to allow the election of the network element responsible for the fault.

Said process of categorization of the group of alarms is performed by each agent following upon the reception of alarms. As the implementation of the function of alarm grouping, the implementation of the function of categorization of the group envisages maintenance of the following information on the agent:

relationships of containment between the corruptible resources;

client/server relationship between the corruptible resources;

alarms received from the apparatus.

The situation outlined previously is exemplified in FIG. 6 with the categorization by the elements A and D of the event X as contiguous fault (Cont) and the categorization by the elements F and B of the event X as external fault (Ext).

Identification of the "Friends" Regarding the Group of Alarms in Question (Step 206)

Following upon categorization of the group of alarms, the agent calculates which are the network elements/agents potentially involved and that it will have to inform as regards what it has received from the managed network element. Said calculation is made starting from the information of topology contained in the agent. The implementation of the function of identification of the friends envisages maintenance on the agent of the following information:

the network topology, i.e., the relationships between the communication resources of the apparatus with the equivalent communication resources of the interconnected network elements;

relationships of containment between the corruptible resources;

the client/server relationship between the corruptible resources;

the group of the alarms in question, in particular the alarmed resource and the category.

This step is not specifically represented in the sequence of FIGS. 4 to 11.

Sending of Information Regarding the Group and Category in Question to the Friends Regarding the Group Itself, with Reception of Similar Information Sent by the Friends of the Agent in Question (Step 208)

Each agent that has received an alarm sends a message to each friend identified regarding the fault in question. In said message, all the information regarding the group of alarms that will serve for identifying the agent responsible for the fault is sent, albeit without explicitly sending the alarm received by the agent. At least the following information will consequently be communicated:

the identifier of the sending agent;

the identifier of the group of alarms;

the alarmed resource; and the category of alarm calculated by the agent.

Once the messages have been received by the friend agents, each individual agent is able to construct its own table regarding the supergroup of alarms that regards an alarmed resource, by grouping together: a) the information of the group of alarms gathered by the agent itself and sent by its own managed apparatus; and b) the information received by each individual friend agent regarding groups of alarms gathered by said friend agents corresponding to a resource adjacent to the alarmed resource on the agent in question. The supergroup is then constructed on the basis of the alarmed resource on the managed apparatus, on the basis of the alarmed resource received in the message of the friends and on the basis of the information of topology: a supergroup is constituted by the groups that belong to different agents and regard resources that are interdependent and adjacent (physically or logically) to one another.

This set of operations is represented in the sequence of FIGS. 7 to 11, which show the constitution, at each agent/element, of a table with which each agent is able to discriminate whether, within a supergroup, it is in the situation of being responsible or not.

End of the Operations of Exchange (Step 210)

At the end of the operations of exchange of the messages, by using the tables constructed in the preceding point, each agent is able to discriminate whether, within a supergroup, it is the agent responsible for the fault or not. Said choice is made by considering the category of the group of alarms associated with the agent and the ones obtained by the friends on the basis of the rules illustrated hereinafter (where, for reasons of simplicity, the category of the group is indicated as category of the agent).

The election of the agent (or, equivalently, of the element) responsible for the fault includes first if an agent is in the internal category and no agent friend is in the internal category, the first is appointed responsible for the supergroup in question and the other agents are self-excluded from the role of agent responsible;

if an agent is in the contiguous category and no agent friend is in the internal or contiguous categories, the first is appointed responsible for the supergroup in question and the other agents are self-excluded from the role of responsible agent;

if two or more friend agents are in the same category and no friend agents of a higher priority category exist ("internal" being higher than "contiguous" and "contiguous" being higher that "external"), the agent of highest protocol level is appointed responsible, and the other agents are self-excluded from the role of responsible agent;

if two or more friend agents are in the same category, and friend agents of a higher priority category do not exist, and if they have the same protocol level, an algorithm of random election has to be used to choose the responsible agent, e.g. the agent with the higher unique identifier is appointed responsible, and the other agents are self-excluded from the role of responsible agent;

an agent with an external category can never be responsible for a supergroup.

The agent that is appointed responsible thanks to the information obtained will then proceed to performing the step of identification of the alarm.

All of the agents that are excluded from the role of responsible agent will maintain the information obtained and will remain listening, waiting for the responsible agent to ask them for execution of a some operation.

It will on the other hand be appreciated that the procedure for identification of the agent responsible for the fault, also identified as step of location of the fault, must not necessarily be implemented on an agent-based distributed architecture. Said procedure is, in fact, generally comprises the following steps:

a) creation of the group of alarms of an apparatus, in relation to a fault;

b) calculation of the category of the group of alarms;

c) identification of the friends of the apparatus for the group of alarms;

d) creation of the supergroup of alarms regarding the fault; and e) election of the agent responsible for the fault.

Said steps can be implemented on a centralized system or else distributed with different modalities, including "hybrid" modalities wherein some of the above steps are performed in a distributed way and the other in a centralized way.

A first solution envisages implementation of the entire procedure on a centralized system, which should process all the alarms coming from the network, creating groups and subgroups of alarms, so as to elect, for each fault, the apparatus responsible. Therefore, all the operations of the flowchart of FIG. 2 (but step 208, which could be omitted, since there will be no need for an exchange of messages) could be performed by a centralized unit, such as unit MA in FIG. 1.

The operation of the system presupposes:

knowledge of the network topology;

definition of rules for creation of the groups, and assignment of the categories; and identification of the friends, creation of the supergroups, and election of the network element responsible.

Another possible solution is that of implementing the first two steps (a and b) on an agent responsible for the network element, and the other steps (c to e), instead, on a centralized system.

In this way, each agent provides the centralized system with the group of alarms having the associated category. The centralized system executes the other steps, using the information coming from the various agents, which should no longer exchange the messages between them, but only send the outputs of their processing operations to the system above them.

Another possibility of implementation consists in the creation of one agent for each network element and of one agent for each type of correlation. The latter could be activated by the messages sent by the agents of the network elements. For example, the agent of a router, in the case where it manages to create a group of alarms on a communication resource, could send messages to the appropriate correlation agents chosen on the basis of the topology of the network. The correlation agents should create the supergroup, possibly exchanging messages, and should elect the responsible agent.

A further possibility is that of omitting the agents and having the above operation performed either completely by the network elements, which should in this case be provided with improved intelligence (i.e. be configured so as to be able to perform all the steps of FIG. 2), or completely by a centralized unit in communication with the network elements, or in a hybrid way, with some steps performed in a distributed way and the other in a centralized way.

It will thus be appreciated that the invention applies in general to any type of telecommunication network in which the network elements are able to signal by means of alarm messages to an external system the presence (or the expected onset) of malfunction.

For example, the invention is applicable to networks for the supply of xDSL and VoIP services and NGN (Next-Generation Network) architectures as illustrated in FIG. 12 and where the various network segments are differentiated, i.e.:

access network (fixed FA or mobile MA, with specific representation of an HN—Home Network);

transport network (IP network or "core");

modules M for control of the service, usually co-operating with other networks NW;

service modules or servers S, with associated thereto a corresponding database DB.

In one implementation, the invention is able to identify, within a network for the supply of xDSL services like the one represented in FIG. 13, the presence of malfunction and location of the fault. The network in question is illustrated schematically through the representation of its components commonly indicated as DSLAM (Digital Subscriber Line Access Module), GBE (GigaBit Ethernet), BRAS (BroadBand Remote Access Module) and IP network.

In another implementation, the invention enables location and identification of the fault within a network for the supply of VoIP services, like the one represented in FIG. 14, in which elements that are similar or equivalent to the ones already introduced with reference to FIG. 12 have been designated by the same codes. In the specific case of the network of FIG. 14 there have been explicitly highlighted the components ATM (Asynchronous Transfer Mode), RG (Residential Gateway), BRAS (BroadBand Remote Access Server), MGW (Media Gateway), SIP (Session Initiating Protocol) Server, AS SIP (Application Server SIP), and Soft Switch.

In yet another implementation, the network enables location and identification of the fault within the transport network, where the transport is performed by IP BackBone nodes on a layer of SDH transmission nodes.

As highlighted in the initial part of the description, the agents can either be distributed in one-to-one correspondence with the network elements or can be semi-distributed or partially centralized.

Consequently, without prejudice to the underlying principles of the invention, the details and the embodiments may vary, even appreciably, with respect to what has been described purely by way of example, without thereby departing from the scope of the invention as defined in the annexed claims.

The invention claimed is:

1. A method for locating a malfunction in a set of elements in a communication network, each of said elements having associated therewith a respective processing entity, comprising:
   detecting said malfunction in at least one of said elements;
   informing others of said elements of a presence of said malfunction;
   generating, in each of said elements, a respective set of alarms related to said malfunction,
   categorizing, in each of said processing entities, the set of alarms generated by the respective element, said set of alarms being categorized in a first category of alarms if the element has detected said malfunction and in a second category of alarms if the element has been informed of the presence of said malfunction; and
   electing one of said elements as element responsible for the malfunction based on the result of said step of categorizing, wherein the electing excludes from the election elements associated with the second category,
   wherein categorizing said at least an alarm in the first category comprises categorizing said at least an alarm in a first sub-category if the malfunction is related to a resource of the element that has communicated its malfunction status to the element, and in a second sub-category if the malfunction is related to a resource of the element that has not communicated its malfunction status to the element or if the malfunction is unrelated to a resource of the element but has been detected by a resource of the element.

2. The method of claim 1, wherein each of said processing entities comprises a management agent.

3. The method of claim 2, wherein the step of categorizing is performed by said management agent.

4. The method of claim 3, wherein said step of electing is also performed by said management agent.

5. The method of claim 1, wherein the step of informing the others of said elements of the presence of said malfunction comprises propagating malfunction information from the at least one of said elements having detected the malfunction to the others of said elements.

6. The method of claim 1, wherein electing the element responsible for the malfunction comprises identifying, among said elements, at least a group of elements in logical or physical connection with each other.

7. The method of claim 6, wherein electing the element responsible for the malfunction further comprises exchanging, among the entities associated with the elements of each identified group, information related to the categories of the sets of alarms generated by the elements of said group.

8. The method of claim 7, wherein electing the element responsible for the malfunction further comprises comparing, in said entities associated with the elements of each identified group, exchanged information.

9. The method of claim 8, wherein electing the element responsible for the malfunction comprises selecting one of the elements if said element has generated a set of alarms in the first sub-category and no other element of the same group has generated a set of alarms in the first sub-category.

10. The method of claim 9, wherein electing the element responsible for the malfunction comprises selecting one of the elements if said element is the element with a highest protocol among a plurality of elements of a same group having generated a set of alarms in the second sub-category and no other element of the same group has generated a set of alarms in the first sub-category.

11. The method of claim 8, wherein electing the element responsible for the malfunction comprises selecting one of the elements if said element has generated a set of alarms in the second sub-category and no other element of the same group has generated a set of alarms in the first or in the second sub-category.

12. The method of claim 1, wherein each of said alarms is indicative of a resource influenced by said malfunction within a corresponding element, comprising the step of grouping two alarms in a same set of alarms if said two alarms are indicative of a same resource or of different resources of a same element having a containment or client/server relationship.

13. A system for locating malfunction in a set of elements in a communication network, wherein each of said elements is configured for generating a set of alarms related to said malfunction, comprising a configuration capable of performing the method of claim 1.

14. A non-transitory computer readable medium encoded with a computer program product which can be loaded into a memory of at least one computer, the computer program product comprising software-code portions for performing the method of claim 1.

15. A method for locating a malfunction in a set of elements in a communication network, each of said elements having associated therewith a respective processing entity, comprising:
   detecting said malfunction in at least one of said elements;
   informing others of said elements of a presence of said malfunction;
   generating, in each of said elements, a respective set of alarms related to said malfunction,
   categorizing, in each of said processing entities, the set of alarms generated by the respective element, said set of alarms being categorized in a first category of alarms if the element has detected said malfunction and in a second category of alarms if the element has been informed of the presence of said malfunction; and
   electing one of said elements as element responsible for the malfunction based on the result of said step of categorizing,
   wherein categorizing said at least an alarm in the first category comprises categorizing said at least an alarm in a first sub-category if the malfunction is related to a resource of the element that has communicated its malfunction status to the element, and in a second sub-category if the malfunction is related to a resource of the element that has not communicated its malfunction status to the element or if the malfunction is unrelated to a resource of the element but has been detected by a resource of the element; and
   wherein electing the element responsible for the malfunction comprises identifying, among said elements, at least a group of elements in physical connection with each other.

16. The method of claim 15, wherein each of said processing entities comprises a management agent.

17. The method of claim 16, wherein the step of categorizing is performed by said management agent.

18. The method of claim 17, wherein said step of electing is also performed by said management agent.

19. The method of claim 15, wherein the step of informing the others of said elements of the presence of said malfunction comprises propagating malfunction information from the at least one of said elements having detected the malfunction to the others of said elements.

20. The method of claim 15, wherein electing the element responsible for the malfunction further comprises exchanging, among the entities associated with the elements of each identified group, information related to the categories of the sets of alarms generated by the elements of said group.

21. The method of claim 20, wherein electing the element responsible for the malfunction further comprises comparing, in said entities associated with the elements of each identified group, exchanged information.

22. The method of claim 21, wherein electing the element responsible for the malfunction comprises selecting one of the elements if said element has generated a set of alarms in the first sub-category and no other element of the same group has generated a set of alarms in the first sub-category.

23. The method of claim 22, wherein electing the element responsible for the malfunction comprises selecting one of the elements if said element is the element with a highest protocol among a plurality of elements of a same group having generated a set of alarms in the second sub-category and no other element of the same group has generated a set of alarms in the first sub-category.

24. The method of claim 21, wherein electing the element responsible for the malfunction comprises selecting one of the elements if said element has generated a set of alarms in the second sub-category and no other element of the same group has generated a set of alarms in the first or in the second sub-category.

25. The method of claim 15, wherein each of said alarms is indicative of a resource influenced by said malfunction within a corresponding element, comprising the step of grouping two alarms in a same set of alarms if said two alarms are indicative of a same resource or of different resources of a same element having a containment or client/server relationship.

26. A system for locating malfunction in a set of elements in a communication network, wherein each of said elements is configured for generating a set of alarms related to said malfunction, comprising a configuration for performing the method of claim 15.

27. A non-transitory computer readable medium encoded with a computer program product which can be loaded into a memory of at least one computer, the computer program product comprising software-code portions for performing the method of claim 15.

* * * * *